US011614102B2

(12) United States Patent
Mueter

(10) Patent No.: US 11,614,102 B2
(45) Date of Patent: Mar. 28, 2023

(54) PRESSURE SUPPLY DEVICE

(71) Applicant: HYDAC SYSTEMS & SERVICES GMBH, Sulzbach/ Saar (DE)

(72) Inventor: Matthias Mueter, Bonn (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 678 days.

(21) Appl. No.: 16/614,831

(22) PCT Filed: May 30, 2018

(86) PCT No.: PCT/EP2018/064163
§ 371 (c)(1),
(2) Date: Nov. 19, 2019

(87) PCT Pub. No.: WO2018/224370
PCT Pub. Date: Dec. 13, 2018

(65) Prior Publication Data
US 2020/0182268 A1 Jun. 11, 2020

(30) Foreign Application Priority Data
Jun. 8, 2017 (DE) .................... 10 2017 005 479.7

(51) Int. Cl.
*F15B 11/17* (2006.01)
*B60T 13/16* (2006.01)
(Continued)

(52) U.S. Cl.
CPC ............ *F15B 11/17* (2013.01); *B60T 13/168* (2013.01); *B60T 13/58* (2013.01); *B62D 5/075* (2013.01);
(Continued)

(58) Field of Classification Search
CPC ........ B60T 13/16; B60T 13/168; B60T 13/18; B60T 13/58; F15B 11/162; F15B 11/17;
(Continued)

(56) References Cited
U.S. PATENT DOCUMENTS 3,994,133 A * 11/1976 Pfeil ...................... F15B 11/17
91/516
4,044,786 A 8/1977 Yip
(Continued)

FOREIGN PATENT DOCUMENTS

DE 27 33 054 2/1978
DE 41 08 915 A1 9/1992
(Continued)

OTHER PUBLICATIONS

Machine translation of DE4108915, retrieved Jul. 16, 2022 (Year: 2022).*
(Continued)

*Primary Examiner* — Bradley T King
(74) *Attorney, Agent, or Firm* — Wenderoth, Lind & Ponack, L.L.P.

(57) ABSTRACT

A pressure supply device for prioritised volume flow splitting, in particular in mobile working machines, includes at least one adjusting pump (2) controllable by an LS signal as main pump, a constant-displacement pump (4) as an auxiliary pump, and two pressure balances. A system is supplied primarily, in particular in the form of steering hydraulics (PL), which outputs an LS signal. A system is supplied secondarily, which outputs a further LS signal, in particular in the form of working hydraulics (PA). A further system is supplied hydraulically, in particular in the form of brake hydraulics (PB). One pressure balance (DW1) is used to supply the system (PL) to be supplied primarily and/or the further hydraulic system (PB), the other pressure balance (Continued)

(DW2) is used to supply the system (PL) to be supplied primarily and/or the system (PA) to be supplied secondarily, The respective pressure balance (DW1, DW2) can be activated by an LS signal in such a way that the constant-displacement pump (4) is also used to supply the system (PA) to be supplied secondarily.

16 Claims, 6 Drawing Sheets

(51) Int. Cl.
*B60T 13/58* (2006.01)
*B62D 5/07* (2006.01)

(52) U.S. Cl.
CPC ............... *B60T 2260/08* (2013.01); *F15B 2211/20538* (2013.01); *F15B 2211/20546* (2013.01)

(58) Field of Classification Search
CPC ............ F15B 2211/20538; F15B 2211/20546; F15B 2211/20553; F15B 2211/20576; F15B 2211/4053; F15B 2211/7142; F15B 2211/41509; F15B 2211/781; B62D 5/075
See application file for complete search history.

(56) References Cited

U.S. PATENT DOCUMENTS

| | | | |
|---|---|---|---|
| 4,335,577 A * | 6/1982 | Lobmeyer | F15B 11/17 60/452 |
| 4,337,620 A * | 7/1982 | Johnson | F15B 11/17 91/518 |
| 4,422,290 A * | 12/1983 | Huffman | F15B 11/17 60/404 |
| 4,559,777 A * | 12/1985 | Leiber | B62D 5/07 60/547.2 |
| 4,665,695 A | 5/1987 | Rau et al. | |
| 5,577,435 A | 11/1996 | Kowalyk et al. | |
| 10,082,159 B2 * | 9/2018 | Vigholm | F15B 11/161 |
| 10,576,944 B2 * | 3/2020 | Fujiki | F16H 61/0204 |
| 10,774,850 B2 * | 9/2020 | Juricak | F15B 1/26 |
| 2019/0136877 A1 * | 5/2019 | Babbitt | F16H 61/4157 |

FOREIGN PATENT DOCUMENTS

| | | |
|---|---|---|
| DE | 41 08 915 C2 | 9/1992 |
| DE | 10 2004 005 606 | 10/2005 |
| EP | 0 795 457 | 9/1997 |

OTHER PUBLICATIONS

International Search Report (ISR) dated Aug. 21, 2018 in International (PCT) Application No. PCT/EP2018/064163.

* cited by examiner

PRESSURE SUPPLY DEVICE

FIELD OF THE INVENTION

The invention relates to a pressure supply device for the prioritized distribution of a volume flow, in particular in mobile machines, including at least one main pump designed as a variable displacement pump, which can be controlled by load-sensing signals, a fixed displacement pump as an auxiliary pump, two pressure maintenance components, a first system to be supplied primarily, in particular in the form of steering hydraulics, which emits a load-sensing signal, a second system to be supplied secondarily, in particular in the form of power hydraulics, that emits a further load-sensing signal, and a further or third system to be supplied hydraulically, in particular in the form of brake hydraulics.

BACKGROUND OF THE INVENTION

Pressure supply systems of this type are known and are mainly used in mobile machines, in particular agricultural tractors. During the operation of such devices, for many phases of operation not all of the existing systems have to be simultaneously supplied with full volume flow, i.e. there is no danger of an under-supply of safety-relevant systems, such as steering. However, when special or extreme work situations occur, for example during certain maneuvers, such as those performed during fieldwork when turning at the headland, and when steering systems, power hydraulics and possibly braking systems request the maximum volume flow, an under-supply may possibly occur. In view of this, it is state of the art, cf. DE 10 2004 005 606 B3, to throttle the return of a non-prioritized load in the case of an under-supply of a prioritized load, such as a power steering system, to ensure sufficient fluid pressure for the prioritized load. Similar known solutions provide for the use of an additional auxiliary pump, which can be operated to support the prioritized system, in particular in the form of a power steering pump.

SUMMARY OF THE INVENTION

In view of this, the invention addresses the problem of providing a pressure supply device of the type mentioned above, which is characterized by an uninterrupted service and a particularly favorable operational behavior.

According to the present invention, this problem is basically solved by a pressure supply device a main pump and an auxiliary pump in the form of a variable displacement pump or a fixed displacement pump and a first and a second pressure maintenance component. In this case, the assigned fluid circuit is designed such that the first pressure maintenance component is used for supplying the system to be primarily supplied, such as the steering system, and/or the further hydraulic system, such as a trailer brake, such that the second pressure maintenance component is used for supplying the system to be primarily supplied and/or the system to be secondarily supplied and such that the respective pressure maintenance components can be controlled by a load-sensing signal, referred to below abbreviated as LS signal, in such a way that the fixed displacement pump is also used to supply the system to be secondarily supplied. The fact that the auxiliary pump even in normal operating conditions, in which there is no LS signal signaling the under-supply of the system to be primarily to be supplied (steering system), is used as an additional supply to support the variable displacement pump, results in a particularly safe and energetically favorable performance of device according to the invention.

Advantageously, the arrangement is such that the main pump directly supplies the system secondarily to be supplied with hydraulic fluid, the pressure of which can be preset. The LS signal for the main pump is received from a shuttle valve, which compares the respective LS signals of the systems to be primarily and secondarily supplied and transmits the LS signal having the higher pressure to the main pump to control the main pump.

In particularly advantageous exemplary embodiments, the output of the auxiliary pump is connected to the input of the first pressure maintenance component. The spring-loaded control side of the first pressure maintenance component is additionally pressurized by the LS pressure on the output side of the shuttle valve or an LS-pressure, which, branched-off from the shuttle valve, relays the LS signal of the load to be supplied secondarily to this control side of the first pressure maintenance component.

Additionally, the spring-loaded control side of the second pressure maintenance component is pressurized by the LS-pressure, which, branched-off upstream of the shuttle valve, transmits the LS signal of the load to be primarily supplied to this control side.

The arrangement is advantageously made such that the two pressure maintenance components are pressurized by the control pressure of the load to be primarily supplied at their further control side arranged opposite from one of the control sides. Alternatively, the other control side of the first pressure maintenance component is pressurized by the control pressure of the load to be secondarily supplied and the control pressure of the load to be primarily supplied is applied to the further control side of the other pressure maintenance component.

A check valve, which opens in the direction of the load to be primarily supplied, is installed in a connecting line between the outputs of the second pressure maintenance component, which is routed between the load to be primarily supplied and the load to be secondarily supplied. Alternatively, a check valve is installed between one of the outputs of the second pressure maintenance component and the system to be secondarily supplied, which check valve closes in the direction of the output of the second pressure maintenance component. The tap of the LS signal for the first pressure maintenance component is located in the supply line to the system to be secondarily supplied between this alternative check valve and the feed point of the main pump.

A further check valve is installed between the two inputs of the two pressure maintenance components or between the input of the first pressure maintenance component and the output of the second pressure maintenance component. The further check valve opens in the direction of the second pressure maintenance component.

A further check valve is arranged between the input of the second pressure maintenance component and the system to be primarily supplied, which check valve opens in the direction of this system. The control line for the other control side of the second pressure maintenance component opens between this further check valve and this system.

Finally, a further check valve is installed between the supply line of the main pump and the input of the second pressure maintenance component, which opens in the direction of the second pressure maintenance component.

2/2-way pressure maintenance components or 3/2-way pressure maintenance components or a 2/2-way pressure maintenance component in combination with 3/2 pressure maintenance components can be used.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
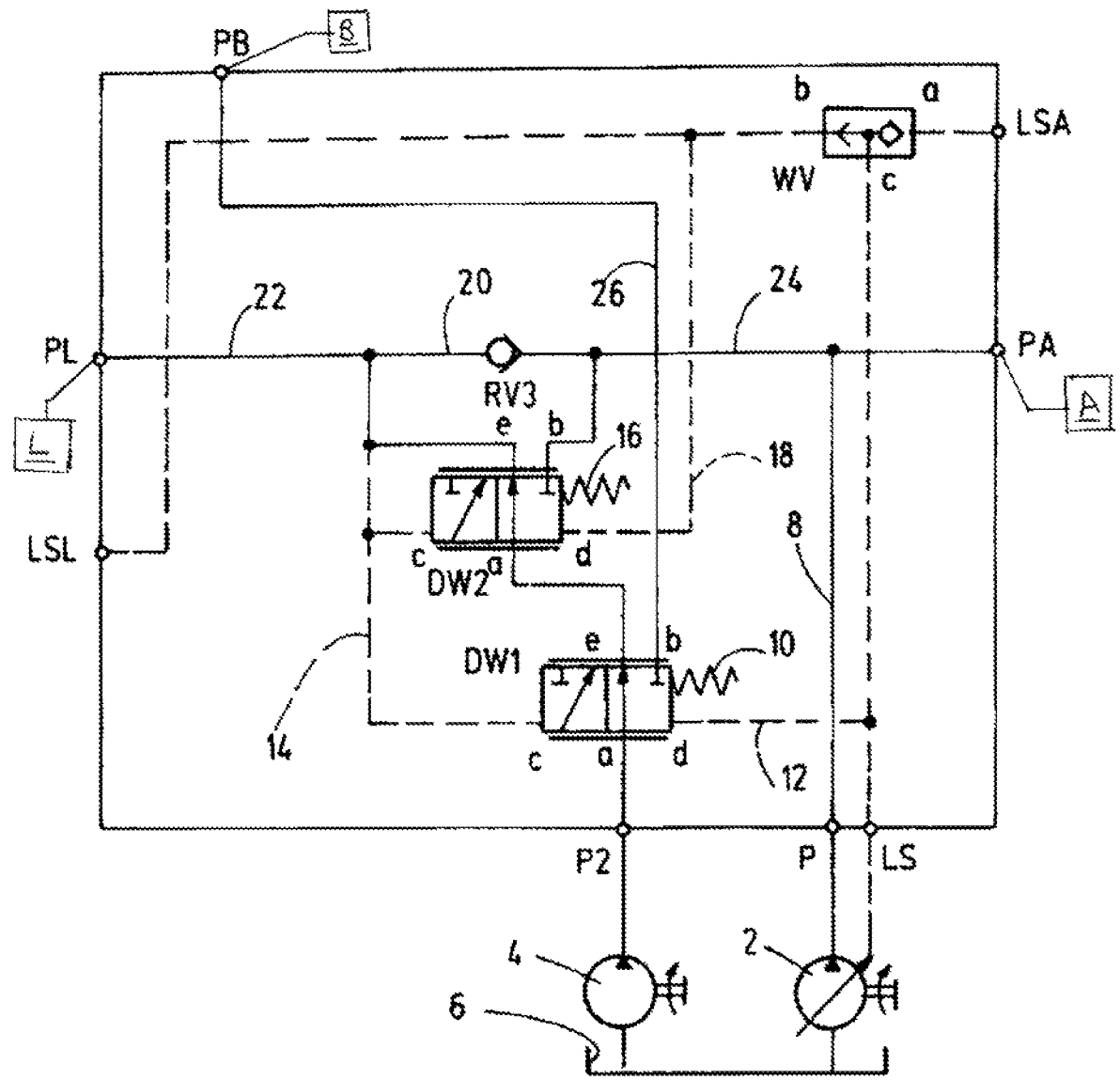
FIG. 1 is a symbolic hydraulic circuit diagram of a first exemplary embodiment of a pressure supply device according to the invention.

In the figures, a main pump 2 is designed as a variable displacement pump, and a fixed displacement pump 4 is used as an auxiliary pump is denoted by 4. Both pumps 2, 4 are fed from a storage tank 6. The output of the variable displacement pump 2 is directly connected to a secondary load port PA via a pressure input P and a supply line 8. Secondary load port PA is routed to a system to be secondarily supplied, such as power hydraulics A. In all exemplary embodiments the output of the fixed displacement pump 4 is connected to an input a of a first pressure maintenance component DW1 via a first pressure input P2. In the exemplary embodiment of FIG. 1 this is formed by a 3/2-way proportional directional valve. One control side d of the first pressure maintenance component is pressurized by a spring 10 and by an LS signal via a control line 12 is applied. The other control side c of the first pressure maintenance component DW1 is connected in the example of FIG. 1 via a control line 14 to the primary load port PL, which is routed to the system to be primarily supplied, in this case the steering. The control side c of the first pressure maintenance component DW1 is pressurized by the pressure of the primary load port PL. The first output b of the pressure maintenance component DW1 is connected to a third load port PB, which is routed to an OC load B, such as a trailer brake. The further output e of the pressure maintenance component DW1 is connected to an input a of a second pressure maintenance component DW2. Like the first pressure maintenance component DW1, the second pressure maintenance component is formed as a 3/2 proportional directional control valve in the example of FIG. 1. A first control side d of the second pressure maintenance component DW2 is pressurized by the pressure of a spring 16 and an LS signal is applied via the control line 18. The other or second control side c of the second pressure maintenance component DW2 is pressurized by the pressure existing in the control line 14, and thus, like the first pressure maintenance component DW1, by the pressure of the primary load port PL.

In FIG. 1, the second and first outputs e and b of the second pressure maintenance component DW2 are connected to a connecting line 20. A first branch 22 of control line 20 is routed to the primary load port PL of the steering system L. The second branch 24 of connecting line 20 is routed to the secondary load port PA of the power hydraulics. A check valve RV3 is installed in this connection line 20, which check valve in FIG. 1 opens in the direction of the load connected to the primary output port PL. The circuit of the example of FIG. 1 is completed by a shuttle valve WV. A first input b of shuttle valve WV receives the LS signal of the system to be primarily supplied, in this case the steering system, from the input port LSL. The other or second input a of which shuttle valve WV receives the LS signal of the system to be secondarily supplied, in this case the power hydraulics, from the input signal LSA. From the output c of the shuttle valve, the highest LS signal is transmitted as a control variable to the variable displacement pump 2 via the output port LS and to the control side b of the first pressure maintenance component DW1 via the control line 12.

Based on the circuit of FIG. 1, the following operation mode results:

The variable displacement pump 2 receives the highest load pressure reported in the system from the shuttle valve WV. The fixed displacement pump 4 is used as an additional supply to ensure a supply of the prioritized function (such as the steering system L) and the OC function (in this case trailer brake) in case of failure of the variable displacement pump 2. Additional fixed displacement pumps may be provided as add-ons, each of which have a further pressure maintenance component (such as the pressure maintenance component DW1) to feed oil into the system if there is an additional volume flow demand of the overall system. The spring force of the pressure maintenance component springs 10 and 16 is lower than the control pressure difference of the variable displacement pump 2. If there is no under-supply of the loads at the load ports PL and PA, wherein the LS pressure of the respective loads is lower than the pressure effective at the load port by at least the control pressure difference, then the pressure maintenance component DW1 is switched against the force of the spring 10. Accordingly, there is no volume flow at the second pressure maintenance component DW2 to be divided. If necessary, any backflow of oil can be prevented by check valves at the load ports PL and PA. The load to be secondarily supplied at the load port PA is directly supplied via the supply line 8 of the variable displacement pump 2, and the load to be primarily supplied at the primary load port PL is supplied by the supply line 8 via the check valve RV3.

If there is an under-supply, wherein the working pressure at at least one of the loads is lower than the LS pressure feedback by the individual load plus the regulating pressure difference of the pump 2, then the balance of forces at the pressure maintenance component DW1 changes. In this way, the volume flow of the fixed displacement pump 4 is partially or completely transferred in the direction of the second pressure maintenance component DW2, and accordingly, the volume flow to supply the further system to be supplied is minimized. In all the exemplary embodiments shown, this is the volume flow which is routed from the output b of the first pressure maintenance component DW1 via an OC supply line 26 to the third load port PB, to which, for example, a trailer brake is connected as an OC load.

The pressure maintenance component DW2 regulates the volume flow additionally provided by the fixed displacement pump 4 via the pressure maintenance component DW1, which is provided for the prioritized load (steering system at primary load port PL). Before an under-supply occurs at the prioritized load, the pressure maintenance component DW2 moves in the direction of the spring force and increases the volume flow flowing to the prioritized load. The check valve RV3 prevents the oil from flowing from the prioritized load to the power hydraulics at the secondary load port PA. If the volume flow of the fixed displacement pump 4 is at least as great as the maximum volume flow at the prioritized load, no under-supply can occur. If the volume flow at the prioritized load is smaller than the rated volume flow of the fixed displacement pump 4, then part of the volume flow can also be supplied to the power hydraulics via the pressure maintenance components DW1 and DW2.

Figure 2:
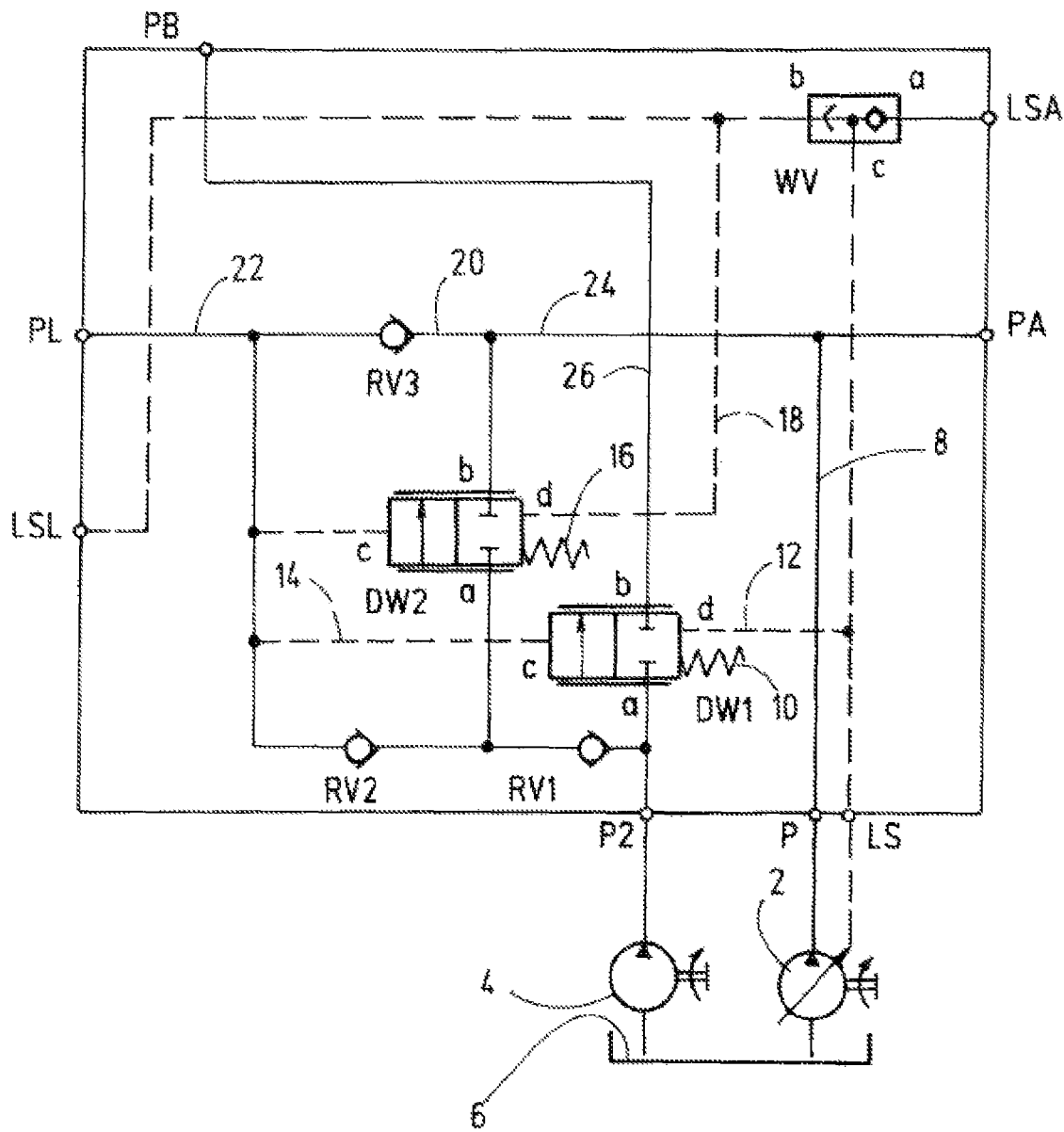
FIGS. 2 to 6 are symbolic hydraulic circuit diagrams of second, third, fourth, fifth and sixth exemplary embodiments, respectively, of pressure supply devices according to the invention.

The exemplary embodiment of FIG. 2 differs from the example of FIG. 1 in that the pressure maintenance components DW1 and DW2 are each formed by 2/2-way proportional valves and that two additional check valves RV1 and RV2 are provided. If there is no under-supply of the LS loads at the load ports PL and PA, the pressure maintenance components DW1 and DW2 are switched against the spring force. If the load pressure of the OC load connected to the third load port PB is lower than the load pressure of the prioritized primary load port PL, the volume flow of the fixed displacement pump 4 can be supplied completely or partially to the OC load. Otherwise, the volume flow of the fixed-displacement pump 4 flows to the prioritized primary load port PL partially or completely via the check valves RV1 and RV2. If required, backward flow of oil from the power hydraulics (via secondary load port PA) to the pressure maintenance component DW2 can be prevented by a non-return valve at the outlet to the power hydraulics. The prioritized load (via primary load port PL) is normally supplied by the variable displacement pump 2 directly via the check valve RV3.

If there is an under-supply at the LS loads, i.e. the working pressure at at least one of the load ports PL, PA is lower than the LS pressure feedback by the individual load plus the regulating pressure difference of the pump 2, then the balance of forces changes at the pressure maintenance component DW1. The maximum LS pressure fed back via the shuttle valve WV plus the pressure equivalent force of the spring 10 are stronger than the pressure at the prioritized primary load port PL, therefore, the pressure maintenance component DW1 is switched in the direction of the spring force. In this way, the volume flow of the fixed displacement pump 4 is partially or completely transferred in the direction of the check valve RV1, and accordingly, the volume flow to supply the OC load connected at the output of third load port PB is minimized. The pressure maintenance component DW2 regulates the volume flow additionally provided by the fixed displacement pump 4 via the check valve RV1, which is provided for the prioritized load (via primary load port PL). Before an under-supply occurs at the prioritized load, the pressure maintenance component DW1 moves in the direction of the spring force and increases the volume flow flowing to the prioritized load via the check valve RV2.

Figure 3:
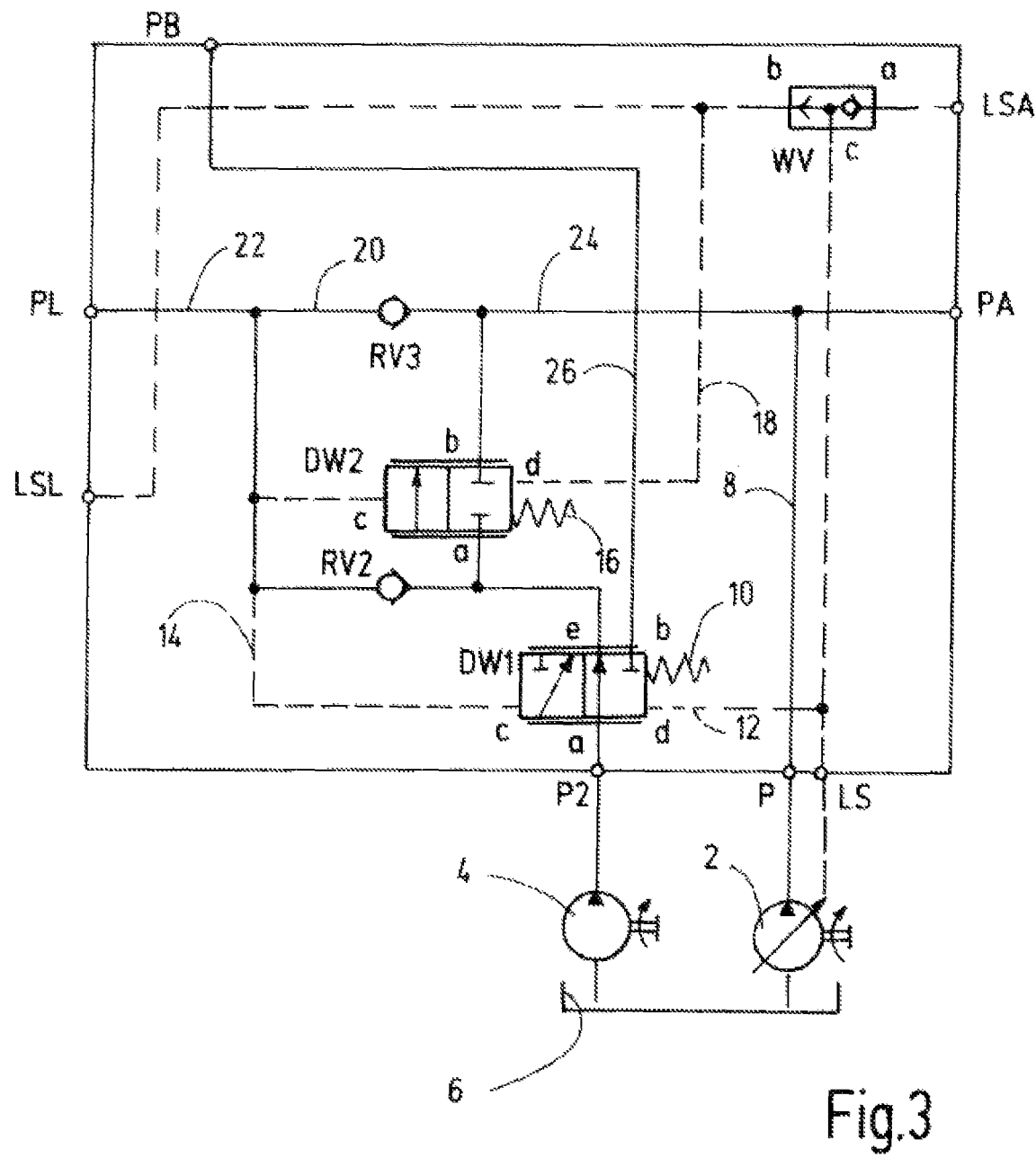

In the exemplary embodiment of FIG. 3, the first pressure maintenance component DW1 is formed by a 3/2 proportional directional control valve, and the second pressure maintenance component DW2 is a 2/2 proportional directional control valve. If there is no under-supply of the LS loads, the pressure maintenance component DW1 is switched against the spring force. The volume flow of the fixed displacement pump 4 is supplied to the OC load. If there is no under-supply, the pressure maintenance component DW2 is switched against the spring force, because the LS pressure of the prioritized load plus the pressure equivalent force of the spring 16 are smaller than the supply pressure at the prioritized load at primary load port PL. If there is an under-supply at the LS loads, the pressure maintenance component DW1 is switched against the spring force. In this way, the volume flow of the fixed displacement pump 4 is partially or completely transferred in the direction of the second pressure maintenance component DW2, and accordingly, the volume flow to supply the OC load to is minimized. Before an under-supply occurs at the prioritized load (at primary load port PL), the second pressure maintenance component DW2 moves in the direction of the spring force and reduces the volume flow flowing to the power hydraulics (at the secondary load port PA). This increases the volume flow to the prioritized load via the check valve RV2.

Figure 4:
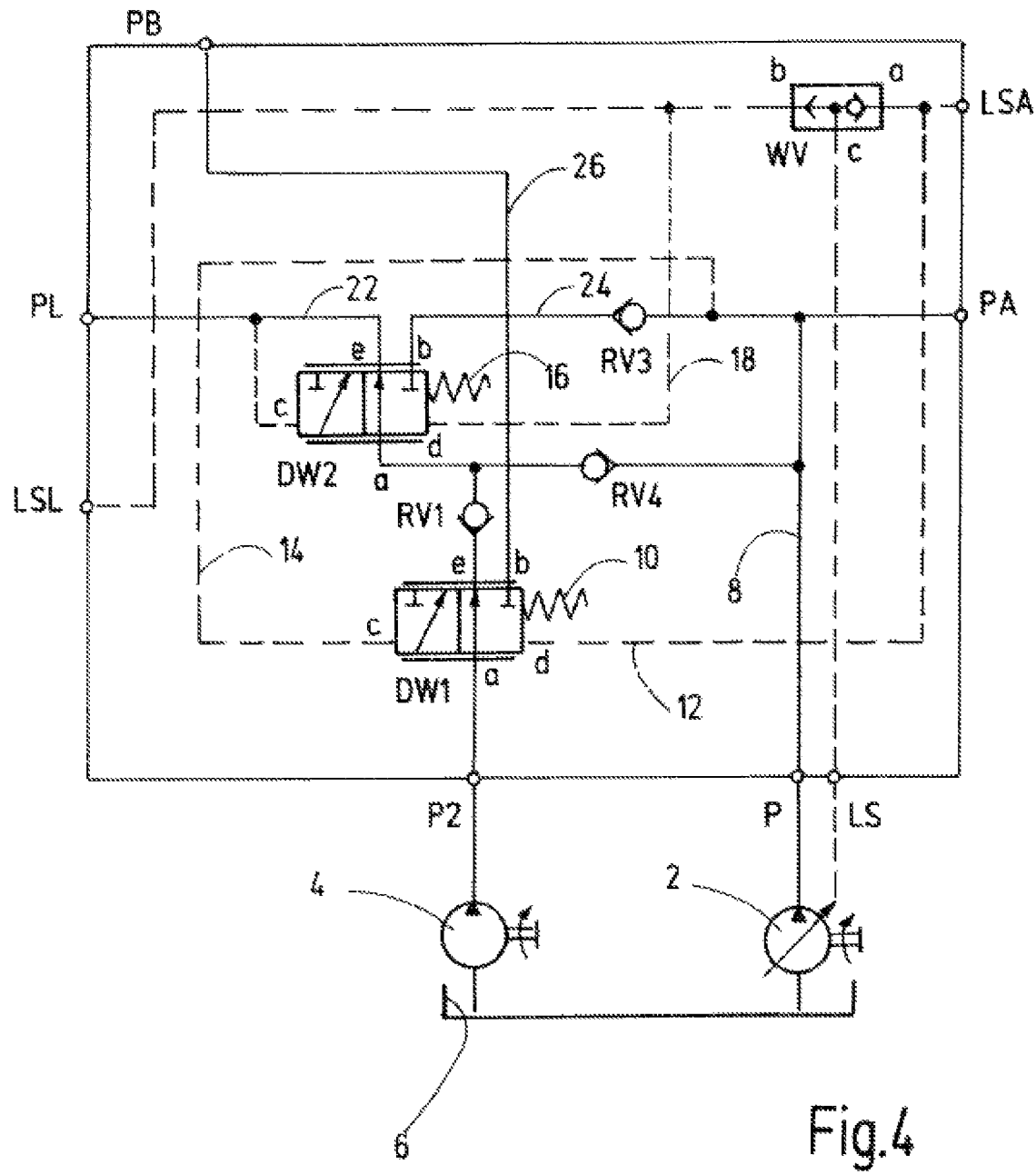

In the example of FIG. 4, as in the example of FIG. 1, each of pressure maintenance components DW1 and DW2 is formed by a 3/2 proportional directional control valve. In addition, a further check valve RV4 is provided. The second pressure maintenance component DW2 regulates the volume flow intended for the prioritized consumer (steering). The inflow starts at the variable displacement pump 2 via the check valve RV4 or at the fixed displacement pump 4 via the first pressure maintenance component DW1 and the check valve RV1. Before an under-supply occurs at the prioritized load, the second pressure maintenance component DW2 moves in the direction of the spring force and increases the volume flow in the direction of the prioritized load. The second pressure maintenance component DW2 ensures that the under-supply always occurs exclusively at the power hydraulics at the secondary load port PA and not at the prioritized primary load port PL. Due to the flow resistance of the second pressure maintenance component DW2, the volume flow for the power hydraulics flows largely directly to the power hydraulics (via secondary load port PA) and not or only partially via the pressure maintenance component DW2. If there is no under-supply, the first pressure maintenance component DW1 is switched against the spring force. The prioritized load (via primary load port PL) is then supplied by the variable displacement pump 2 directly via the check valve RV4 and the pressure maintenance component DW2. The volume flow of the fixed displacement pump 4 is then completely routed to the OC load at the third load port PB via the first pressure maintenance component DW1. If there is an insufficient supply to the load at the load port PA of the power hydraulics, the balance of forces changes at the first pressure maintenance component DW1. Because the reported LS-pressure of the power hydraulics plus the pressure equivalent force of the spring 10 is stronger than the working pressure 5 at the secondary load port PA of the power hydraulics, the first pressure maintenance component DW1 is switched in the direction of the spring force. In this way, the volume flow of the fixed displacement pump 4 is partially or completely transferred via the check valve RV1 in the direction of the second pressure maintenance component DW2, and accordingly, the volume flow to supply the OC load at the third load port PB is minimized. The check valve RV4 ensures that the volume flow can only flow to the second pressure maintenance component DW2.

Figure 5:
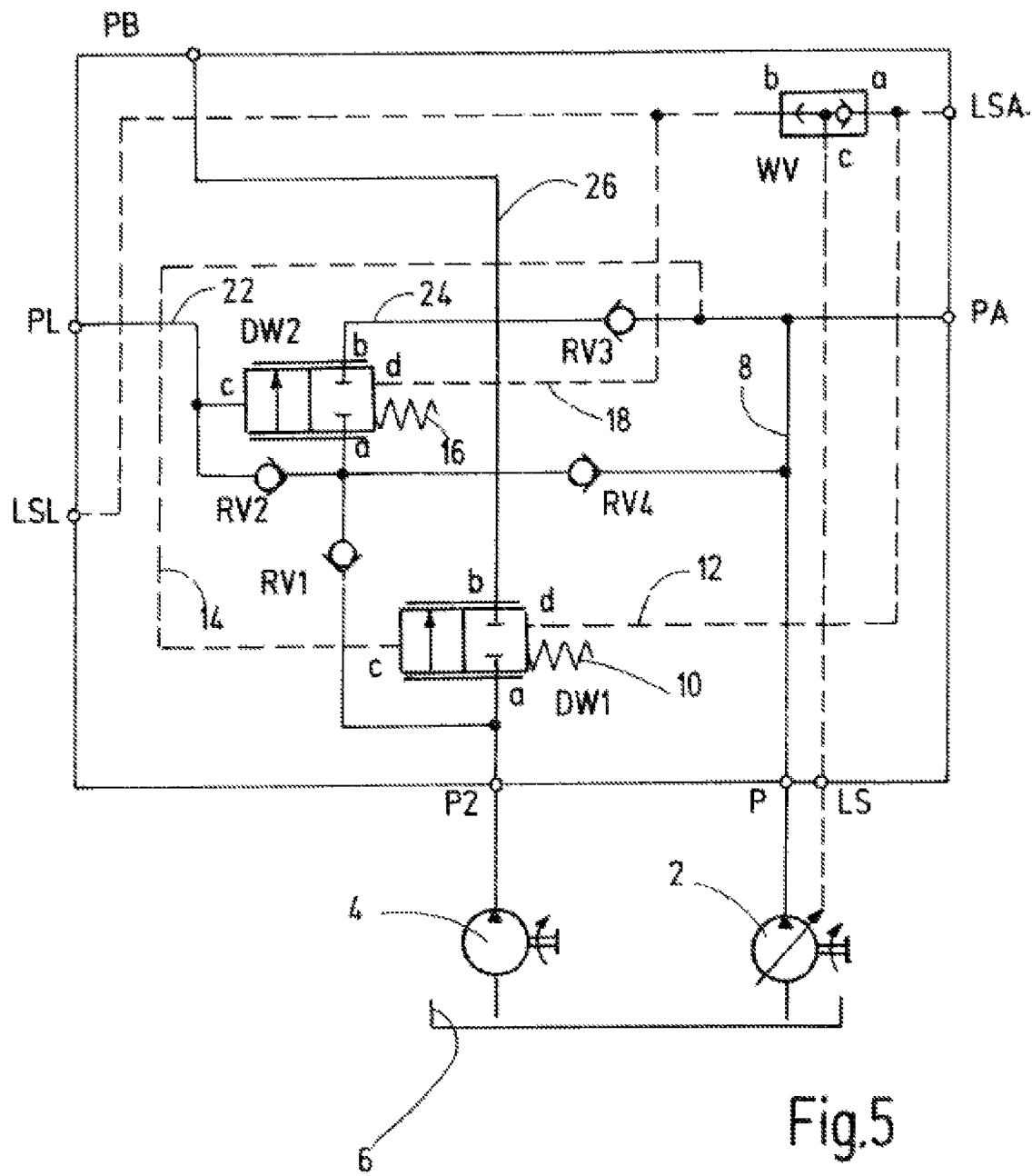

In the variant of FIG. 5, both pressure maintenance components DW1 and DW2 are formed by 2/2 proportional directional control valves. If there is no under-supply of the LS load at the secondary load port PA of the power hydraulics, the first pressure maintenance component DW1 is switched against the spring force. The prioritized load at the primary load port PL is then supplied by the variable displacement pump 2 directly via the check valves RV4 and RV2. If the load pressure of the OC load at the third load port PB is lower than the load pressure of the prioritized load (at the primary load port PL), the volume flow of the fixed displacement pump 4 can be supplied completely or partially to the OC load at third load port. Otherwise, the volume flow of the fixed-displacement pump 4 flows to the prioritized load (at the primary load port PL) partially or completely via the check valves RV1 and RV2. If there is an insufficient supply to the LS load at the secondary load port PA of the power hydraulics, the first pressure maintenance component DW1 is switched in the direction of the spring force. In this way, the volume flow of the fixed displacement pump 4 is partially or completely transferred in the direction of the second pressure maintenance component DW2 and the check valve RV2 via the check valve RV1, and accordingly, the volume flow to supply the OC load at the third load port PB is minimized. The check valve RV4 prevents the direct inflow to the power hydraulics at the secondary load port PA. Compared to the variant of FIG. 4, there is an advantage in that the volume flow from the variable displacement pump 2 to the prioritized load (at the primary load port PL) is not routed via the second pressure maintenance component DW2, i.e. pressure losses are minimized.

Figure 6:
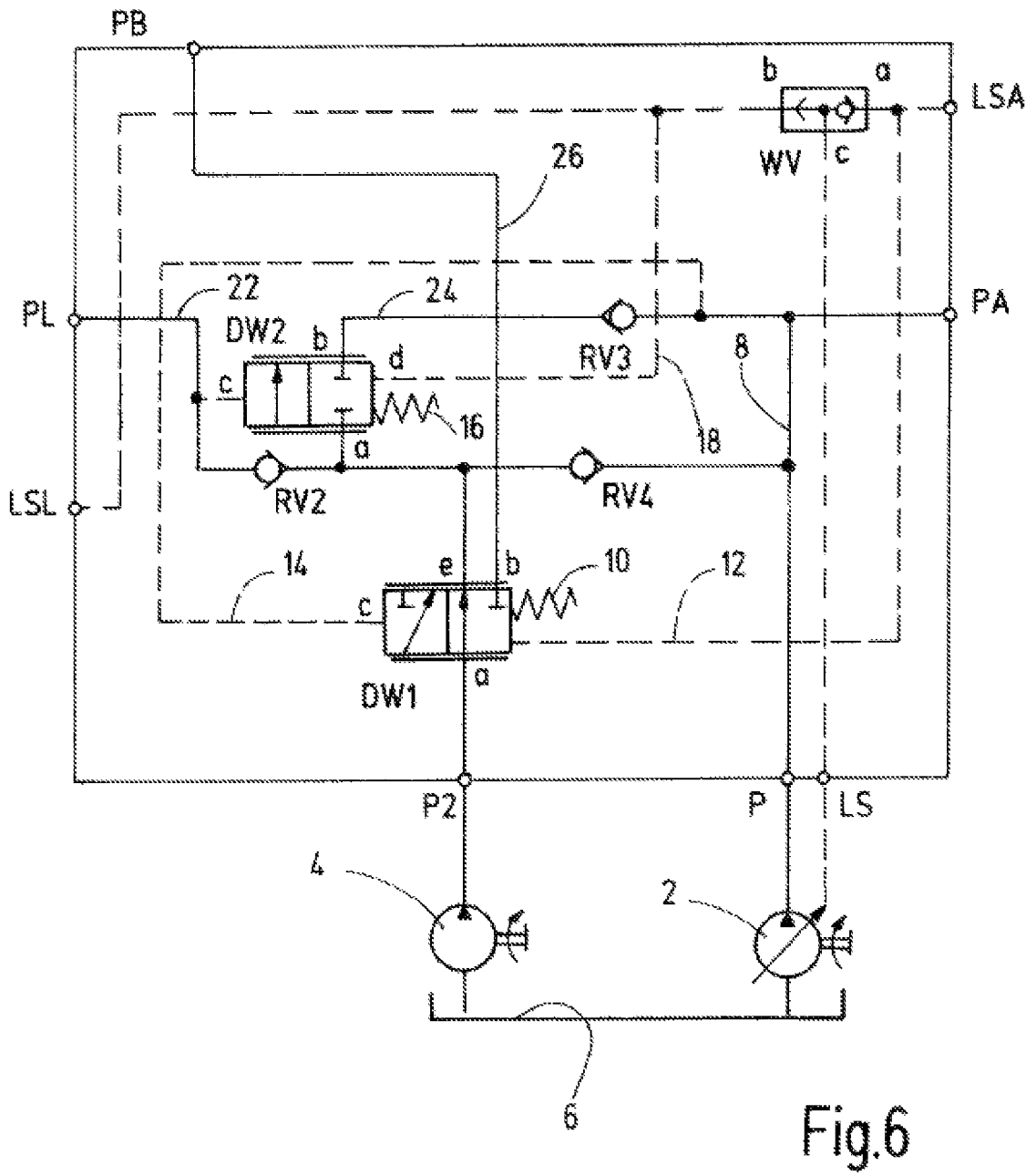

The circuit of FIG. 6 is similar to the variants of FIGS. 1 and 2, except that the first pressure maintenance component DW1 is a 3/2 proportional directional control valve, and the second pressure maintenance component DW2 is a 2/2 proportional directional control valve. The second pressure maintenance component DW2 in turn regulates the volume flow intended for the prioritized load (at the primary load port PL). The inflow starts at the variable displacement pump 2 via the check valve RV4 or at the fixed displacement pump 4 via the first pressure maintenance component DW1. Before an under-supply occurs at the prioritized load (at the primary load port PL), the second pressure maintenance component DW2 moves in the direction of the spring force and reduces the volume flow in the direction of the power hydraulics (at the secondary load port PA). As a result, the volume flow in the direction of the prioritized load is increased via the check valve RV2. The second pressure maintenance component DW2 ensures that the under-supply always occurs exclusively at the power hydraulics (at the secondary load port PA) and not at the prioritized function (at the primary load port PL). Due to the lower flow resistance, the volume flow for the power hydraulics at the secondary load port PA flows directly to the power hydraulics and not or only partially via the second pressure maintenance component DW2. If there is no under-supply of the LS load of the power hydraulics (at the secondary load port PA), the first pressure maintenance component DW1 is switched against the spring force, and the prioritized load (at the primary load port PL) is then supplied from the variable displacement pump 2 directly via the check valves RV4 and RV2. The volume flow of the fixed displacement pump 4 is supplied to the OC load at the third load port PB in full. If there is an insufficient supply at the LS load of the power hydraulics (at the secondary load port PA), the balance of forces changes at the first pressure maintenance component DW1, resulting in it being switched in the direction of the spring force. In this way, the volume flow of the fixed displacement pump 4 is partially or completely transferred in the direction of the second pressure maintenance component DW2, and accordingly, the volume flow to supply the OC load at the third load port PB is minimized. The check valve RV4 prevents the direct inflow into the power hydraulics at the secondary load port PA. The advantage over the variants of FIGS. 1 to 3 is that the volume flow from the variable displacement pump 2 to the prioritized load (at the primary load port PL) does not run via the second pressure maintenance component DW2.

While various embodiments have been chosen to illustrate the invention, it will be understood by those skilled in the art that various changes and modifications can be made therein without departing from the scope of the invention as defined in the claims.

The invention claimed is:

1. A pressure supply device for prioritized volume flow distribution, the pressure supply device comprising:
    a variable displacement pump being a main pump controlled by LS signals and having an outlet;
    a fixed displacement pump being an auxiliary pump;
    first and second pressure maintenance components;
    primary and secondary load ports; and
    a system of fluid supply lines connecting the variable displacement pump, the fixed displacement pump, the first and second pressure maintenance components and the primary and secondary load ports in fluid communication such that the first maintenance pressure component supplies fluid pressure to at least one of the primary load port or the secondary load port, such that the second maintenance pressure component supplies fluid pressure to at least one of the primary load port or the secondary load port, and such that the first and second pressure maintenance components are controlled by first and second LS signals, respectively, with the fixed displacement pump supplying fluid pressure to the secondary load port, the outlet of the variable displacement pump being directly connected in fluid communication to the secondary load port only via a pressure input and one of the fluid supply lines.

2. A pressure supply device according to claim 1 wherein the variable displacement pump directly supplies hydraulic fluid pressure to the secondary load port at a preset pressure; and
    a shuttle valve receives and compares respective LS signals of the primary and secondary load ports and transmits a higher pressure of the respective LS signals to the variable displacement pump to control pressure settings of the variable displacement pump, the shuttle valve being in fluid communication with the variable displacement pump.

3. A pressure supply device according to claim 2 wherein an outlet of the fixed displacement pump is connected in fluid communication to an input of the first pressure maintenance component, a spring-loaded first control side of the first pressure maintenance component being pressurized by at least one of pressure on an output side of the shuttle valve or an LS pressure branched off from the shuttle valve from the secondary load port.

4. A pressure supply device according to claim 3 wherein a spring-loaded first control side of the second pressure maintenance component is pressurized by an LS pressure branched off upstream of the shuttle valve and transmitting fluid pressure of the primary load port.

5. A pressure supply device according to claim 2 wherein a spring-loaded first control side of the second pressure maintenance component is pressurized by an LS pressure branched off upstream of the shuttle valve and transmitting fluid pressure of the primary load port.

6. A pressure supply device according to claim 4 wherein each of the first and second pressure maintenance components has a second control side opposite the first control side thereof, the second control side of the first pressure maintenance component being pressurized by fluid pressure at the secondary load port, the second control side of the second pressure maintenance component being pressurized by fluid pressure at the primary load port.

7. A pressure supply device according to claim 1 wherein a check valve is in a connecting line of the fluid supply lines connected in fluid communication to and between first and second outputs of the second pressure maintenance component and opens in a direction of the primary load port, a first branch of the connecting line being connected in fluid communication to the primary load port and a second branch of the connecting line being connected in fluid communication to the secondary load port.

8. A pressure supply device according to claim 1 wherein a check valve is in a connecting line of the fluid supply lines connected in fluid communication to and between an output of the second pressure maintenance component and the secondary load port and closes in a direction of the output of the second pressure maintenance component, an LS signal pressurizing control side of the first pressure maintenance component being connected in fluid communication by a connecting line of the fluid supply lines to the secondary load port at a location between the check valve and a feed point of the variable displacement pump.

9. A pressure supply device according to claim 1 wherein a check valve is connected in fluid communication to and between inputs of the first and second pressure maintenance components and opens in a direction of the second pressure maintenance component.

10. A pressure supply device according to claim 1 wherein a check valve is connected in fluid communication to and between an output of the first pressure maintenance component an input of second pressure maintenance component and opens in a direction of the second pressure maintenance component.

11. A pressure supply device according to claim 1 wherein a non-return valve is connected in fluid communication to and between an input of the second pressure maintenance component and the primary load port, is connected in fluid communication to a control line connected in fluid communication to a control side of the second pressure maintenance component and opens in a direction of the primary load port and the control line.

12. A pressure supply device according to claim 1 wherein a check valve is in one of the fluid supply lines that is connected in fluid communication with the outlet of the variable displacement pump and an input of the second pressure maintenance component and opens in a direction of the second pressure maintenance component.

13. A pressure supply device according to claim 1 wherein each of the first and second pressure maintenance components is a 2-port/2-way valve.

14. A pressure supply device according to claim 1 wherein each of the first and second pressure maintenance components is a 3-port/2-way valve.

15. A pressure supply device according to claim 1 wherein one of the first and second pressure maintenance components is a 2-port/2-way valve and the other of the first and second pressure maintenance components is a 3-port/2-way valve.

16. A pressure supply device according to claim 1 wherein
the primary load port is connected to a hydraulic steering of a mobile machine;
the secondary load port is connected to power hydraulics of a mobile machine; and
a third load port of the system is connected to a hydraulic brake of a mobile machine.

* * * * *